Patented Aug. 12, 1947

2,425,663

UNITED STATES PATENT OFFICE 2,425,663

HOIST

Mack Wooldridge, Oakland, Calif., assignor to American Tractor Equipment Corporation, a corporation of California Application July 16, 1945, Serial No. 605,280

2 Claims. (Cl. 212—8)

This invention relates to a hoist and a hoist mount upon a track laying type tractor.

It is an object of the present invention to provide a hoist mount for a track laying type tractor.

Another object of the present invention is to provide a novel hoist construction.

Track laying type tractors are widely used in construction work wherein their mobility over rugged terrain is particularly advantageous. In the construction of pipe line, for example, provision of a hoist on a tractor facilitates handling of pipe and other equipment. In accordance with the present invention, I provide a hoist mount for a track laying type tractor which is readily provided in place and which can be utilized as a hoist on either side of the tractor.

Figure 1:
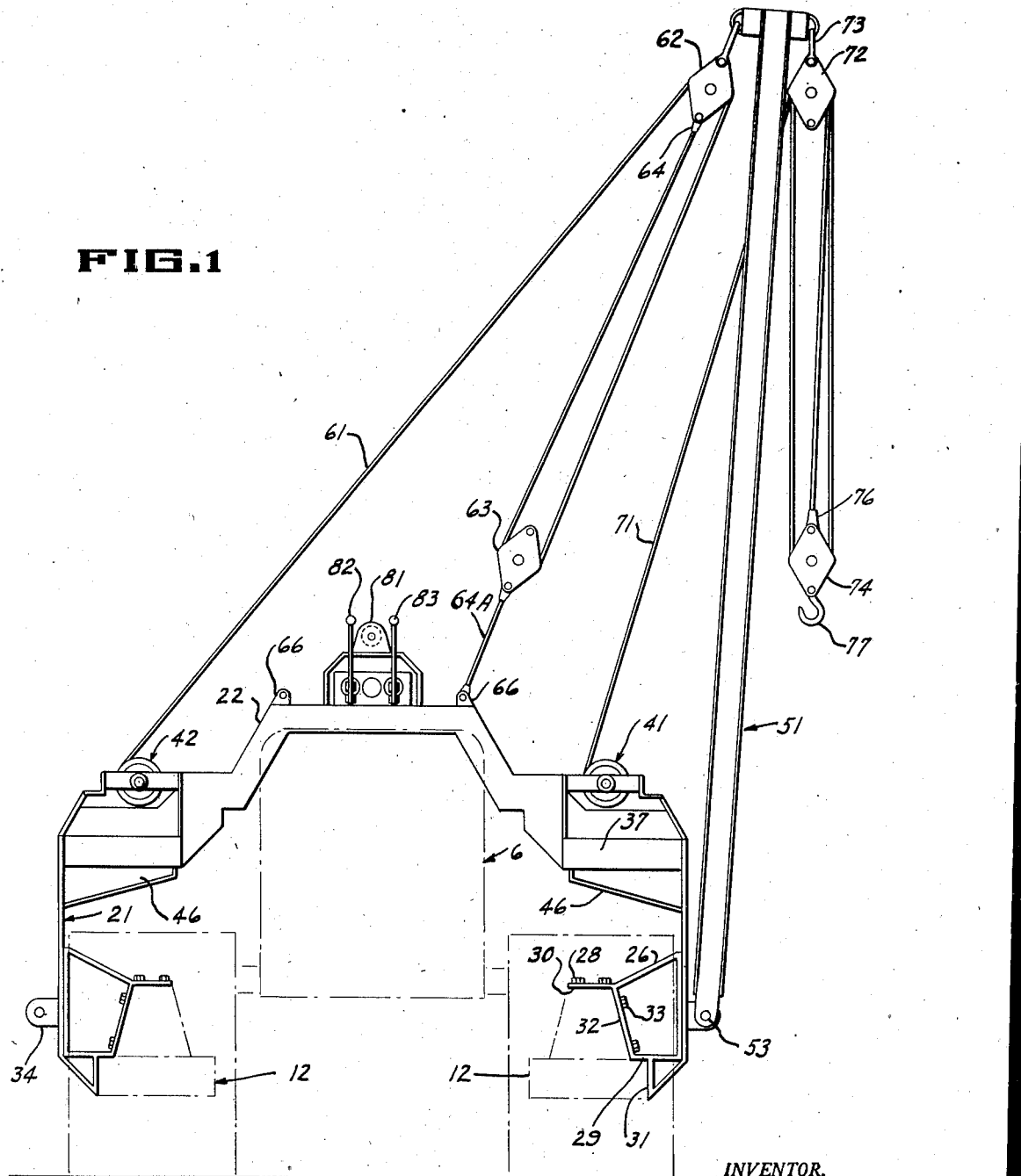

The invention includes other objects and features of advantage, some of which, together with the foregoing, will appear hereinafter wherein the present preferred form of hoist mount for a track laying type tractor are disclosed. In the drawings accompanying and forming a part hereof, Figure 1 is a side elevation showing the hoist mount on a track laying type tractor.

Figure 2:
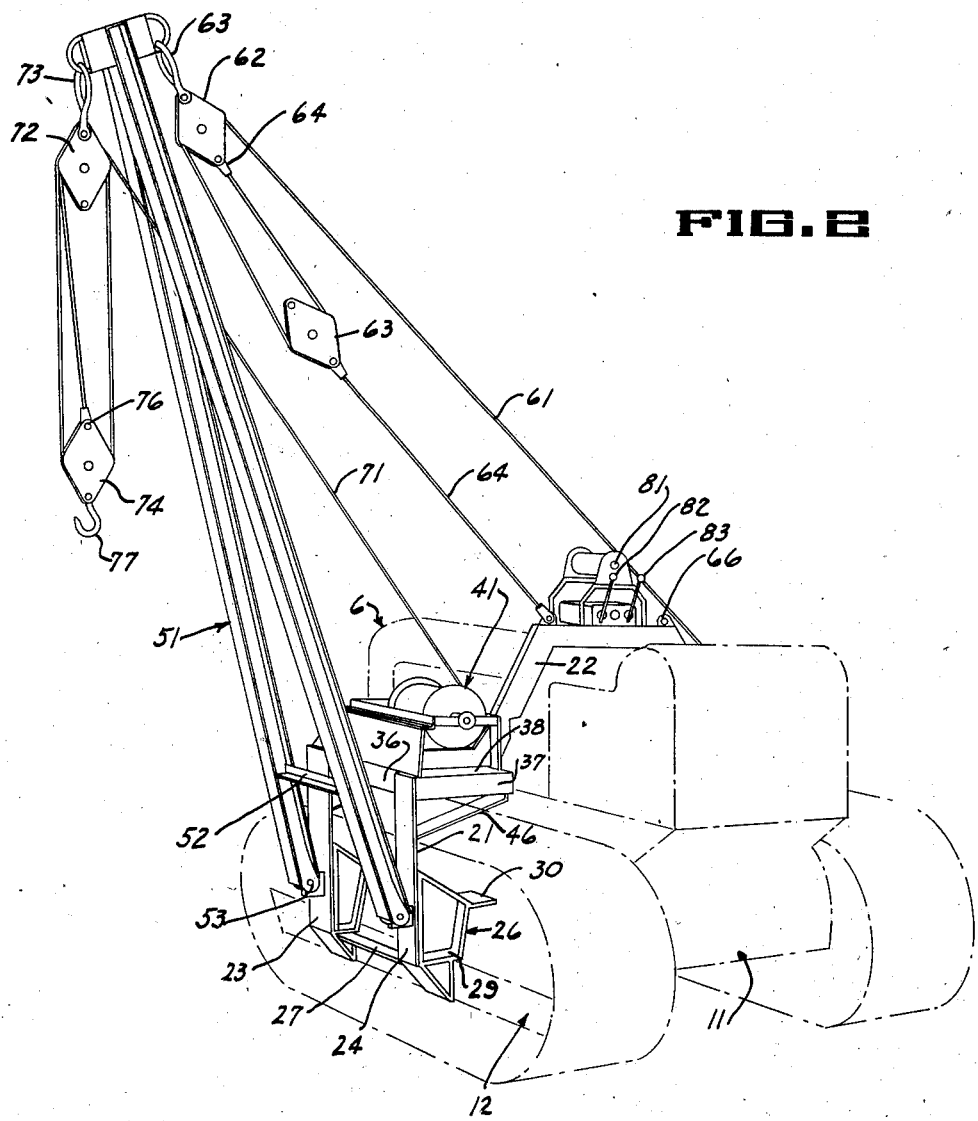

Figure 2 is a perspective view of the hoist and hoist mount on a track laying type tractor.

Referring to the drawings, a track laying type tractor is generally indicated by numeral 6. This can be any one of the usual forms of track laying type tractors available upon the market. It is known that these include a main frame 11 and a track frame 12 hinged upon each side of the main frame. As is well known in the art, each track frame is hinged, usually at the rear end of the main frame about the main sprocket axle while a spring is extended between the track frames and the main frame at the forward end of the main frame.

In accordance with the present invention, I provide a first and a second support frame 21. As will be presently described in detail, each support frame is mounted upon a track frame and an auxiliary frame 22 is extended between the two support frames to join them together.

Each support frame includes a pair of parallel, vertically extending members 23 and 24. A clip or bracket structure generally indicated by numeral 26 is provided and is secured to each vertical support member 23 and 24, the two brackets being secured together by a horizontal member 27. Each bracket 26 includes horizontal pad portions 30 for attachment by studs 28 to a portion of the track frame 12. The second pad is indicated by numeral 29 and fits a channel member 31 on each track frame. Bracket portion 32, provided intermediate to pads, is secured to another portion of the track frame by studs 33. An ear 34 is extended from each of the vertical members 23 and 24 to receive the crane 51, as will be presently described. At their upper ends, vertical members 23 and 24 are joined together by a transverse member 36, while other horizontally extending members 37 and a plate 38 are mounted to extend inwardly over each track frame and track and provide a support for a hoist structure generally indicated by numerals 41 and 42. A brace 46 is positioned between each vertical member and plate 38.

Between each of the support frames an auxiliary frame 22 is extended, arching upwardly over that portion of the tractor in the rear of the engine housing, usually just rear of the fireboard of the tractor and being suitably secured by studs or bolts (not shown) to each of the side frames. Preferably, the two side frames and the auxiliary frame are fashioned as separate units; the support frames are first positioned upon the truck frames and thereafter secured together by inter-positioning of the auxiliary frame. In this manner, a simple hoist support mount is provided which can be readily installed or removed.

To provide the crane portion of the hoist, crane legs, indicated generally by numeral 51, are provided. In the form illustrated these are provided by suitable channel iron members, joined together at their upper ends and fixedly spaced apart intermediate their lower ends by a transverse member 52. The extreme lower ends of each of the legs is hinged as at 53 on one of the extending pair of ears 34 provided upon one of the supports.

It should be noted that ear pairs are provided on opposite sides of the tractor. This enables the crane to be mounted on either side of the tractor. Thus, as appears in Figure 1, the crane legs are mounted upon the right-hand side of the tractor while in the perspective view shown in Figure 2, the crane has been mounted upon the left-hand side of the tractor. A change from one side to the other is readily accomplished by lowering the crane until it rests upon the ground or other support. The pins providing hinge connection 53 are then released and several presently described cables released. The tractor is then moved so that the opposite pair of ears are presented for attachment to the crane, the several cables again secured whereupon the crane is ready for manipulation upon the other side of the tractor.

Means are provided for raising and lowering the crane with respect to the tractor. In the device illustrated, this comprises a flexible wire rope or cable 61 passed about one of the winches 41 or 42 and threaded through a pulley block 62 supported as at 63 on the end of the crane 51. The flexible rope or cable 61 is passed from pulley 62 about another pulley block 63 and then back to the first pulley block for attachment as at 64. Pulley block 63 is adjustably supported as by cable 64A from one of the eyes 66 provided upon the auxiliary frame 22.

Means are provided for raising and lowering an object while the crane is in the desired position of adjustment. In the form shown in the drawing, this comprises a flexible wire rope or cable 71 trained about a pulley block 72 supported as at 73 on the crane. To provide a multiple lift, pulley 72 is preferably of the multiple sheave type. The flexible cable 71 is also passed about another pulley block 74 and thence back through pulley block 72, the end of the cable 71 being attached as at 76 to pulley 74. A hook 77 or other attachment means is provided upon pulley block 74. The other end of the flexible rope 71 is passed about one of the winches 41 or 42.

Referring to the drawings, I have indicated at 81 a hydraulic control mounted on the auxiliary frame 22 and including a pair of valve control handles 82 and 83. These are utilized in supplying power from a hydraulic pump and driven by the tractor engine, (not shown) which supplies hydraulic fluid under pressure to suitable motors each associated with winch 41 and with winch 42. Valve control handles 82 and 83 control selectively the manipulation of the motors associated with winches 41 and 42. In this manner, an operator can readily adjust the position of the crane or can raise and lower an object by shortening or lengthening the length of flexible rope 71 from the winch about which this is trained. The crane support is such that the tractor can be moved while an object is supported by the crane, the operator having an unobstructed view all about the tractor.

Members 36 and 37 and plates 38 are joined together to form fluid receptacles in which excess fluid is stored and cooled before use in the high pressure hydraulic system. Frame 22 provides a support for the high pressure hoses which extend from the fluid control 81 to each winch, the latter exhausting fluid for cooling into the radiator-receptacles provided by hose members 36 and 37 and plates 38. An outlet (not shown) extends from each receptacle to the hydraulic pump.

I claim:

1. A derrick structure for use on a track laying type tractor having a main frame and a pair of track frames on opposite sides of the main frame, a pair of substantially like support frames, each of said pair of frames having a derrick boom mounting thereon, a pair of winches, each winch being mounted on one of said pair of support frames, an auxiliary frame extending over and closely fitting said main frame, each of said pair of support frames being supported by one of said track frames, said pair of support frames being rigidly joined together by said auxiliary frame, a derrick boom adapted to be supported on either of said support frame mountings, a first line extended from one winch to said boom to raise and lower said boom, and a second line from the other winch and supported by said boom to raise and lower a load carried by said second line.

2. A derrick structure for use on a track laying type tractor having a main frame and a pair of track frames on opposite sides of the main frame, a pair of substantially like support frames, each of said pair of frames having a derrick boom mounting thereon, a pair of winches, each winch being mounted on one of said pair of support frames, an auxiliary frame extending over and closely fitting said main frame, each of said pair of support frames being supported by one of said track frames, said pair of support frames being rigidly joined together by said auxiliary frame, means carried by said auxiliary frame for selectively controlling said winches, a derrick boom adapted to be supported on either of said support frame mountings, a first line extended from one winch to said boom to raise and lower said boom, and a second line from the other winch and supported by said boom to raise and lower a load carried by said second line.

MACK WOOLDRIDGE.

REFERENCES CITED

The following references are of record in the file of this patent:

UNITED STATES PATENTS

| Number | Name | Date |
|---|---|---|
| 1,840,998 | Alban | Jan. 12, 1932 |
| 1,906,362 | Brown | Mar. 2, 1933 |
| 1,925,169 | Berg | Sept. 5, 1933 |
| 1,985,285 | Erdahl | Dec. 25, 1934 |
| 2,003,599 | LeTourneau | June 4, 1935 |
| 2,077,741 | Cardwell | Apr. 20, 1937 |